United States Patent [19]
Sakou et al.

[11] Patent Number: 5,329,596
[45] Date of Patent: Jul. 12, 1994

[54] AUTOMATIC CLUSTERING METHOD

[75] Inventors: Hiroshi Sakou, Shiki; Masahiro Abe, Iruma, both of Japan

[73] Assignee: Hitachi, Ltd., Tokyo, Japan

[21] Appl. No.: 943,688

[22] Filed: Sep. 11, 1992

[30] Foreign Application Priority Data

Sep. 11, 1991 [JP] Japan .................................. 3-259784

[51] Int. Cl.$^5$ .............................................. G06K 9/70
[52] U.S. Cl. ........................................ 382/37; 382/14
[58] Field of Search ..................... 382/37, 39, 14, 36, 382/38

[56] References Cited

U.S. PATENT DOCUMENTS

| | | | |
|---|---|---|---|
| 3,810,162 | 5/1974 | Ewing, Jr. et al. | 382/37 |
| 4,773,099 | 9/1988 | Bokser | 382/38 |
| 4,975,975 | 12/1990 | Filipski | 382/37 |
| 5,075,896 | 12/1991 | Wilcox et al. | 382/39 |

OTHER PUBLICATIONS

Rumelhart, David E., et al., Parallel Distributed Processing, vol. 1, Chapter 8, The MIT Press, Cambridge, Massachusetts Feb. 2, 1988.
Artificial Intelligence Handbook, Published by Hon, Pattern Matching, p. 324, Compiled by The Artificial Intelligence Association of Japan.

*Primary Examiner*—Leo H. Boudreau
*Assistant Examiner*—Larry J. Prikockis
*Attorney, Agent, or Firm*—Fay, Sharpe, Beall, Fagan, Minnich & McKee

[57] ABSTRACT

An automatic pattern recognition method has a short processing time, can be applied to nonlinear separation problems, and can perform similarity calculations. The method: Divides a plurality of sample data of known categories into a plurality of classes; When the sample data in a divided class is not all in the same category, repeats dividing the sample data into subclasses until sample data in a subclass has only one category; Expresses the relationship between classes and subclasses in a tree-structure representation and determines the standard pattern for each class and subclass from the sample data contained there; and Checks which of the tree-structured classes input data of unknown category is nearest, by calculating the distance to the standard pattern of each class, and then, when the class has subclasses, performs a similar check until the lowest-level subclass is reached to determine the subclass the input data is closest to. The category of the lowest-level subclass is taken as the category of the input data.

6 Claims, 12 Drawing Sheets

AUTOMATIC CLUSTERING METHOD

BACKGROUND OF THE INVENTION

The present invention relates to automatic data clustering, which is particularly useful in pattern recognition, for example in speech pattern recognition or image pattern recognition or text/character pattern recognition.

Pattern recognition, and particularly data clustering involves a large volume of sample data for learning and a determination of a category of input data for pattern recognition, and more particularly the identifying and classifying of data representing a speech pattern or an image pattern, for example.

In pattern recognition, there are generally two representative methods that employ learning with high volumes of known sample data having plural categories for determining a region that each known category occupies in a pattern space and then determining the category of unknown data according to the region of the unknown data. The two methods may be represented by the Artificial Intelligence Handbook, published by Ohm, "Pattern Matching", page 324, compiled by the Artificial Intelligence Association; and Chapter 8 of *Parallel Distributed Processing*, entitled "Learning Internal Representations by Error Propagation", by D. E. Rumelhart and others, compiled by the Institute for Cognitive Science, University of California, San Diego. Specifically, the two methods that employ the above are:

(1) Pattern matching by preparing the standard pattern for each category and taking as the category for unknown input data a category whose standard pattern is nearest to the input data. There are some pattern matching methods that do not prepare standard patterns, but instead they use sample data of known categories and then take the category of the sample data which are closest to the input data to be the category of the unknown input data, which is known as the nearest neighbor method.

(2) A layer-type neural network arranges non-linear units called neurons in layers and learns transformation rules between sample data and the categories as weights between neurons. A commonly used learning method is back propagation based upon the steepest descent method. Output data produced when unknown input data are given to the neural network are taken as the category of the unknown input data.

SUMMARY OF THE INVENTION

It is an object of the present invention to analyze the prior art techniques for pattern recognition (especially the clustering technique), and to identify problems and the sources of the problems, so that such problems may be solved or overcome.

In classifying or identifying data, one should consider not only the decision accuracy, but also the time taken for obtaining such decisions. As to the decision accuracy in particular, it is essential in practice to have a function that can check the similarity of a pattern and reject it when the pattern is other than that of an expected category. Problems with conventional methods in this respect are described below as they relate to the above mentioned two prior art methods.

(1) In the pattern matching, where the similarity is determined by calculating distances of the input pattern to the standard patterns, the determination of the nearest standard pattern requires the input data to be compared with each of the standard patterns. Therefore, the processing time is generally very large. Further, since this method depends upon the distance of the input data with respect to the standard patterns for checking the similarity, the method often cannot be applied to non-linear separation problems where multi-dimensional sample data are distributed such that one or more sample data points are contained in other data, for example where the input data have multiple categories.

Figure 11:
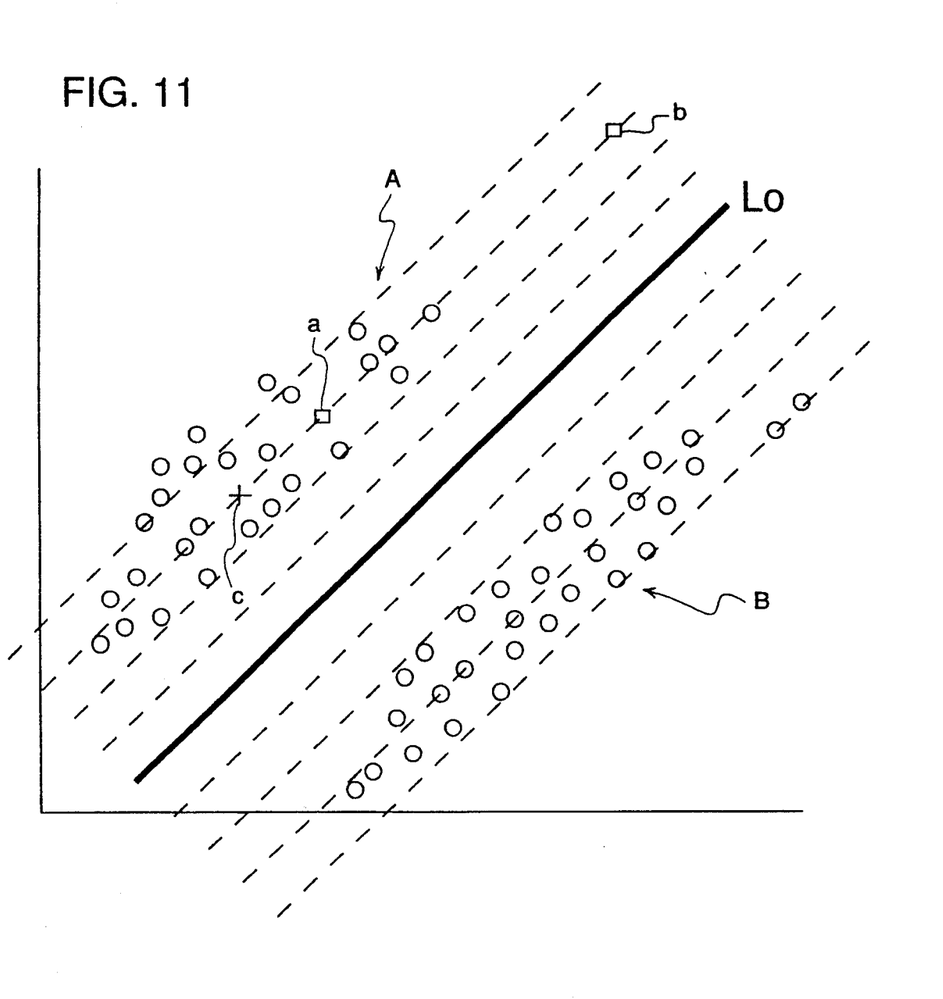
FIG. 11 is a diagram illustrating the present invention analysis of a problem with a conventional layer-type neural network.

(2) The layer-type neural network determines a separation surface for categorizing, when solving problems including non-linear problems. That is, the separating surface may be linear or it may be non-linear. For example, in a two-dimensional problem in which data group A and data group B are to be separated, as shown in FIG. 11, which figure is useful for analyzing the prior art, which analysis is part of the invention, a separating surface $L_0$ is obtained as a result of learning. Contour lines or equal value lines, which are shown as dotted lines in FIG. 11, are produced by the neural network and are symmetrical with respect to the separating surface $L_0$. Hence, unknown input data of, say, point a and point b have the same output values in the layer-type neural network and they are both therefore classified into data group A on one side of the separating surface $L_0$. The similarity of the input data with the known sample data is usually defined as a distance from a distribution center of the sample data. The distribution center may also be defined as a standard pattern or code book. This means that data at point b must be significantly lower in similarity than data at point a. Despite this fact, the layered neural network output values for these points a and b are the same. This reveals the inability of the layered neural network method to correctly calculate similarity. This also indicates that while the layer-type neural network method can be applied to simple classifications, it is not suitably applied to classifications that depend upon similarity.

In FIG. 11, the separating surface $L_0$ is a flat plane, linear in the figure. The layer-type neural network may also employ non-linear planes or lines as separating surfaces, but the contour lines, dotted lines in FIG. 11, would be spaced from the non-linear lines in a manner similar to that on a topographical map so that two pieces of data, similar to a and b in FIG. 11, could still be on the same contour line to be classified in the same category although they are very dissimilar by being very far apart, in the same manner that the points a and b are dissimilar although classified as the same in FIG. 11. That is, the non-linear type of layer-type neural network employing a non-linear separating surface would have the same problem as that discussed with respect to FIG. 11 employing a linear separating surface $L_0$.

It is an object of the present invention to provide an automatic classification or clustering method for input data, particularly for pattern recognition, which solves the above mentioned problems experienced with conventional methods, has a short processing time, and can be applied to non-linear separation problems while still accurately determining similarity.

To solve the above mentioned problems recognized and analyzed with respect to the prior art according to the present invention, the present invention employs the following steps:

(1) Dividing sample data of a plurality of known categories into a plurality of classes or regions during learning;

(2) When all the sample data in a divided class do not have the same category, further dividing the data into subclasses, and recursively repeating the division for any subclass that does not have only one category for the same sample data until all undivided classes and subclasses have only one category of sample data within them, that is until each undivided class or subclass contains only one category of sample data, as a further part of learning;

(3) As a further part of the learning, expressing the relationship between the classes and subclasses in a tree structure representation with the tree division corresponding to the class/subclass division, and determining the standard pattern from the sample data contained in each class and subclass; and (4) After the above mentioned learning, providing input data of unknown category, and deciding, from a distance of input data of an unknown category from the standard pattern of each class, which of the tree structured classes the input data are nearest; then when the decided class is divided into subclasses in the tree structure, determining to which of the subclasses the input data are closest on the basis of the distance to the standard pattern of each subclass; and repeating the above process for each following subclass along the tree structure until a lowest-level, that is terminal or end-leaf or undivided, subclass is reached in the tree structure and taking the category of such lowest-level subclass as the recognized category of the input data.

Because of the steps numbered (1) and (2), even when the sample data is in an inclusive state, since the so called non-linear separation problem can be converted into a plurality of partial linear problems by dividing the data, the method of this invention can be applied to non-linear separation problems and can also calculate similarity at high accuracy and high speed. As to the step (3), there is provided a tree structure for data classification and standard patterns associated with each node of the tree structure. The step (4) performs checks according to the tree structure obtained by the step (3). Because of the above features, the matching or comparison of the unknown input data does not have to be done for all standard patterns, but only the standard patterns along one path of the tree structure with no branching, which speeds up the processing as comparing to the prior art methods. The similarity of unknown input data can be determined by calculating the distance to the standard patterns only at each branch of the tree structure along the path taken, and calculations for other branches that are not along the path taken do not have to be made.

BRIEF DESCRIPTION OF THE DRAWING

Further objects, features and advantages of the present invention will become more clear from the following detailed description of a preferred embodiment, shown in the accompanying drawing, wherein.

DETAILED DESCRIPTION OF THE PREFERRED EMBODIMENT

As used herein, the term "standard pattern" is equivalent to the known term "code book".

Figure 5:
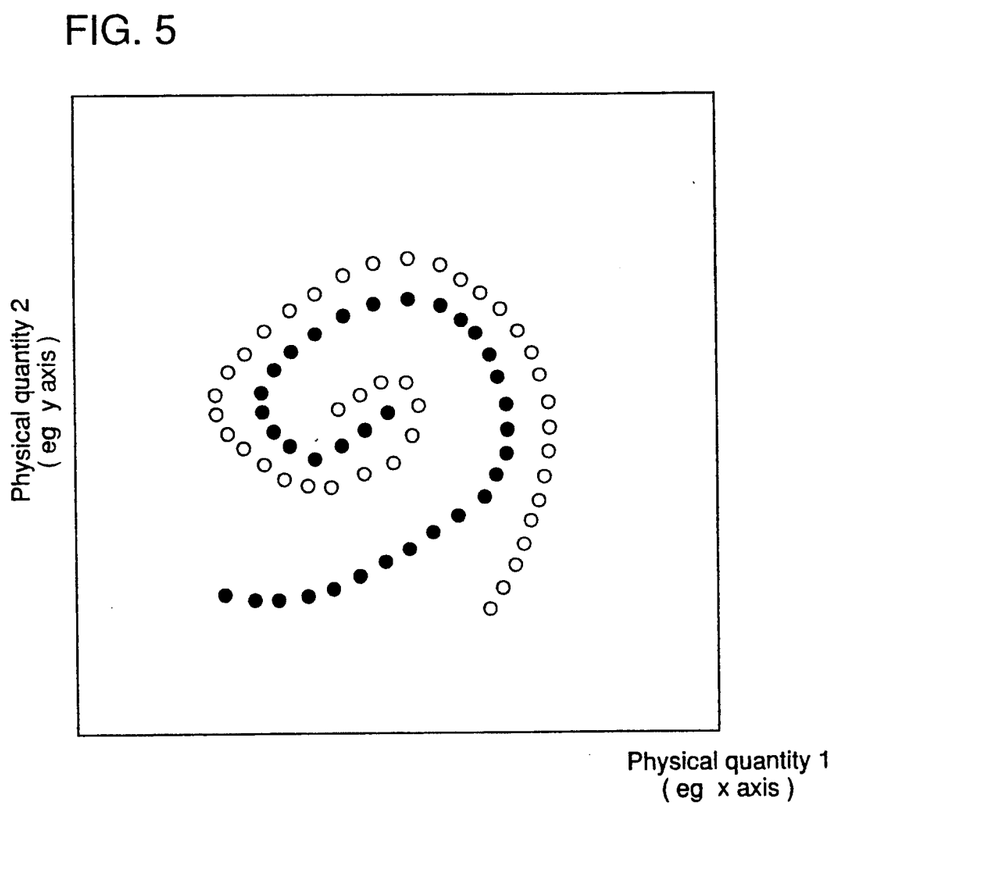
FIG. 5 shows a distribution of sample data in a two-dimensional space defined by axes of two physical quantities.
Figure 6:
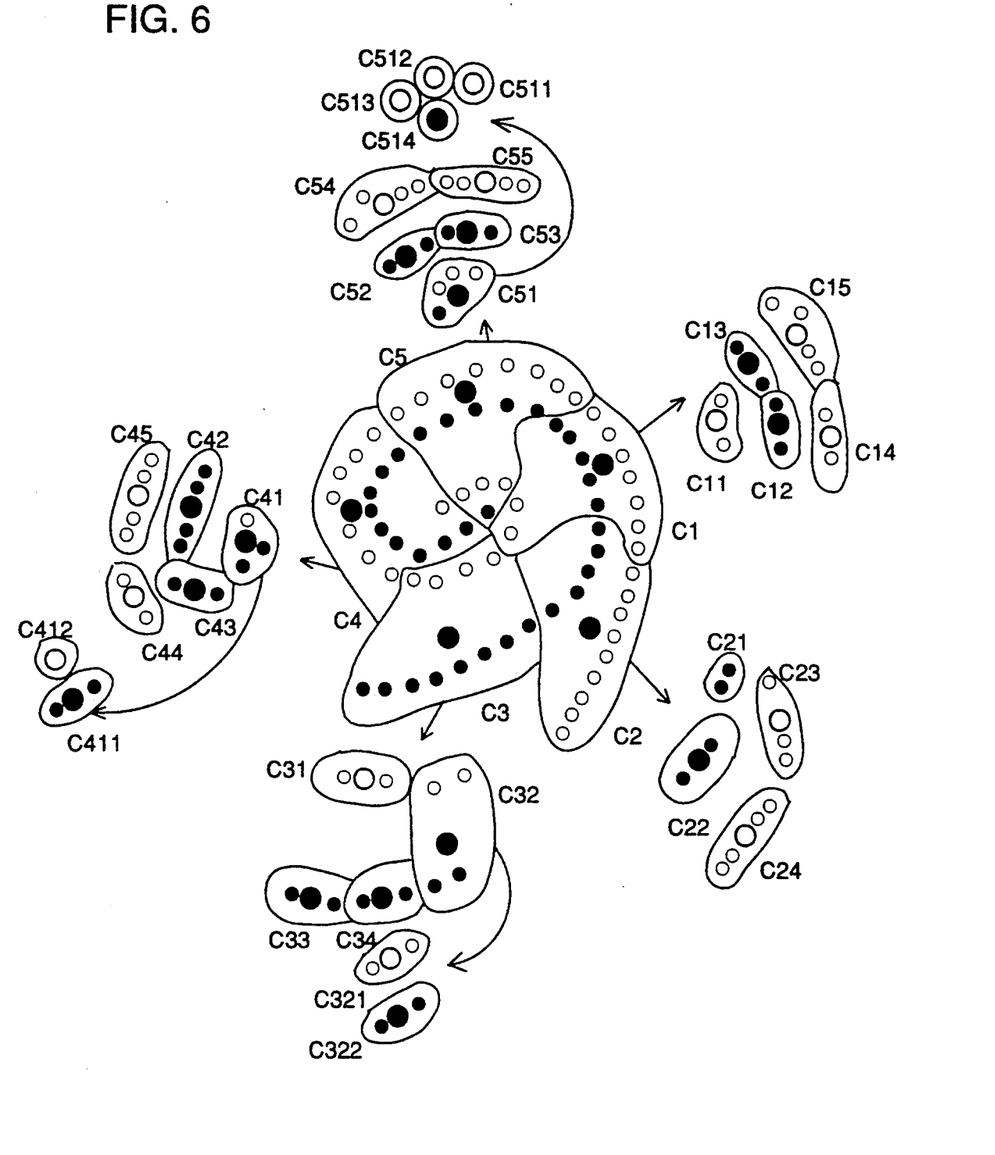
FIG. 6 shows an outline of principles of dividing actual sample data of FIG. 5 into subclasses.
Figure 7:
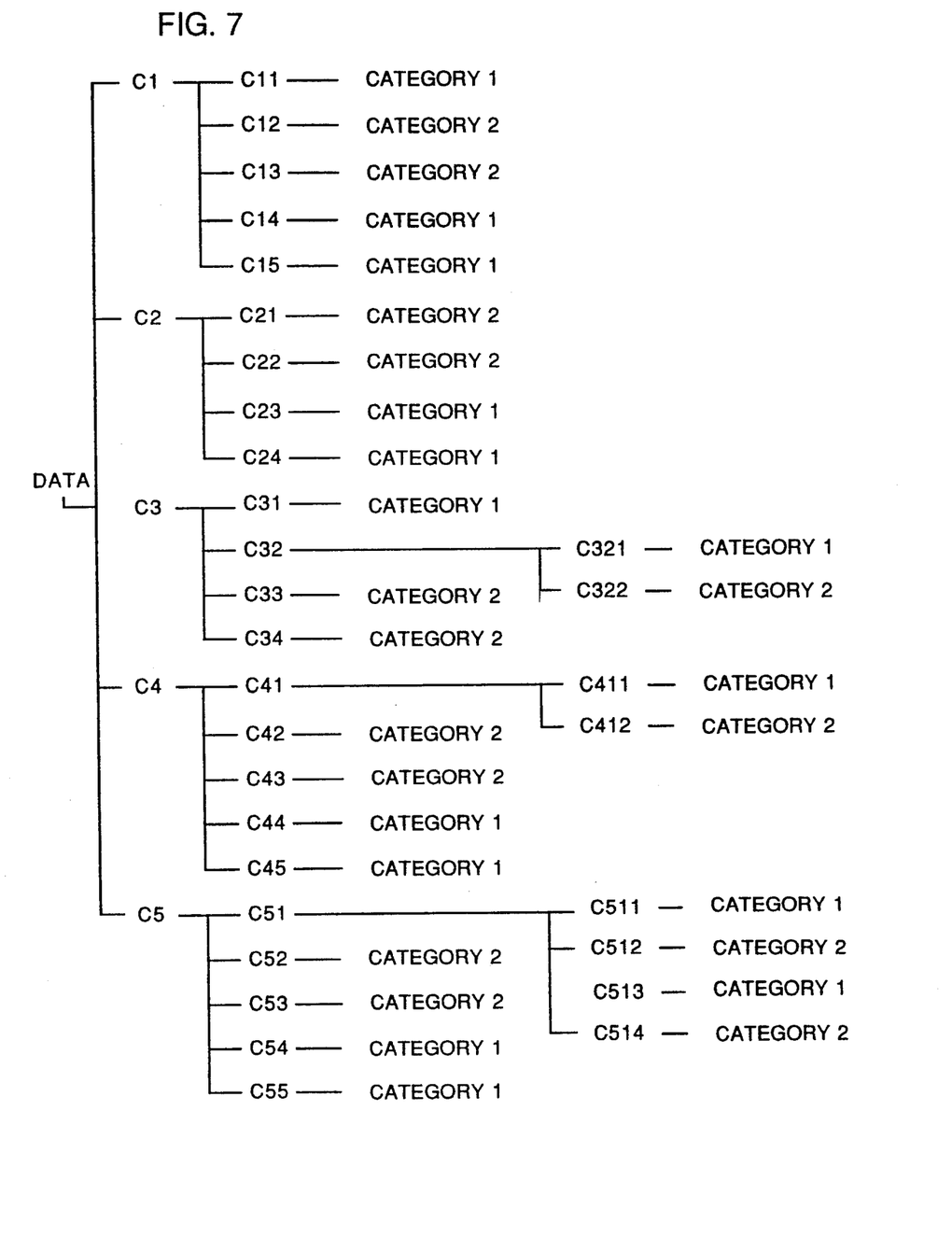
FIG. 7 shows the tree structure showing the relationship among subclasses, each containing actual sample data of FIG. 5.

A preferred embodiment of the present invention will be described, particularly starting with FIGS. 1–8. FIGS. 5, 6 and 7 are useful in discussing the principle of the present invention for generating a tree structure for data clustering and standard patterns, according to the learning mode. Data clustering is a technique that is particularly useful in pattern recognition, and pattern recognition may be classified into various types, for example image pattern recognition or speech pattern recognition or text pattern recognition. Generally in a learning mode, sample data of known category or known categories are used to teach a system and thereafter, based upon the results of teaching/learning in a recognition mode, data may be input of unknown category so that the category of the unknown input data may be determined.

FIG. 5 shows an example of the distribution of sample data in a two-dimensional space. As used herein, "sample data" refers to data used in the learning mode, and "input data" refers to data to be categorized in a recognition mode according to the results of the learning mode. A learning mode is the same as a teaching mode.

The two dimensions of the two-dimensional space are respectively plotted on the X axis as a physical quantity 1, for example length as a first dimension. The second dimension is plotted along the Y axis as a physical quantity 2, for example weight. These dimensions may be of any type, including the mentioned physical quantities, in practice. Multi-dimensional data having dimensions far greater than two may be employed, as will be discussed later, but for the purpose of understanding the basic principle of the present invention, it is sufficient to consider only two-dimensional data.

The sample data to be used in this learning mode have two known categories, represented in the drawing by a first category or category 1 indicated by an open or white-filled circle, and category 2 indicated by a closed or solid black filled circle. For the drawing, it is seen that the category 1 data have a general locus of a spiral and category 2 data have the general locus of a spiral within the spiral of the category 1 data, so that a separation line drawn between the two spirals would be a curved or two-dimensional line. Since the separation line is curved, it is non-linear and therefore the separation problem presented by FIG. 5 is considered a non-linear separation problem.

The sample data of FIG. 5 are shown in the center of FIG. 6, and FIG. 6 is a schematic representation of the learning mode, wherein the sample data are clustered into classes and subclasses according to category.

First, the sample data of FIG. 5 are classified into a plurality of classes, namely C1, C2, C3, C4, C5 as shown in FIG. 6. The number of classes may be arbitrarily set, and here by way of example the number of classes for the initial division is set at five. This division is obtained as follows:

The geometric center of the sample data is determined and at the geometric center, five closely spaced points, for example in a small ring, are considered. With respect to each of these five points, each of the closely adjacent circles representing the closest of the sample data have their distances measured to each of the points, and these closely adjacent sample data circles closest to a point are grouped to belong to the respective class of the closest point, so that only the closely adjacent of the sample data are classified into respective ones of the five classes according to their closeness to the five points representing the five classes. The points of the classes will now shift outward as they will now represent the standard pattern or code book or geometric center of the now included closely adjacent data circles.

Next, moving outward, the next closest adjacent circles of the sample data are classified by again calculating the distance from each of them to each of the new class standard patterns, the standard patterns are revised to take in consideration the newly added data for the class, and these steps are repeated until all of the data circles are classified into one of the five classes. In this manner, the classes take on virtual boundaries as shown in FIG. 6.

When one of these classes does not have only a single category of data within it, it is further subdivided in the manner mentioned above into a plurality of subclasses. For example, class 1 is seen to have data of both category 1 and category 2 within its boundary. Therefore, the sample data of class 1 is further divided or clustered into subclasses C11, C12, C13, C14, C15 by the same clustering method that was used for determining the original classes C1-C5. It is seen that the subclasses C11, C12, C13, C14, C15 each contained only one category of data, so that no further subdivision is needed. For each class and subclass shown, the final standard pattern is shown as a large black dot, which as mentioned represents the geometric center of the data within the respective class or subclass. In the manner mentioned above, the other classes C2, C3, C4, C5 are further subdivided into subclasses.

While one method of dividing or clustering data has been set forth above according to the present invention, other methods of dividing or clustering may be employed according to the present invention. By way of example, the class C3 has been shown as being subdivided into subclasses C31, C32, C33 and C34. When the sample data in a subclass are not all of the same category, the subclass is divided again. As seen, subclass C32 contains both category 1 data and category 2 data. Therefore, subclass C32 is divided into further subclasses C321 and C322, and such division continues until each undivided class or subclass has only data of one category. Similarly, subclasses C411, C412 and C511, C512, C513, C514 are subdivisions of subclasses C41 and C51, respectively. Therefore, it is seen that the symbols C1, C2, C3, ... C12, C22, ... C514 represent the names of classes and subclasses. Terminal or undivided classes and subclasses are C11-C15, C21-C24, C31, C321, C322, C33, C34, C411, C412, C42, C43, C44, C45, C511-C514, C53, C53, C54, C55. Thus, category 1 data are only in subclasses C11, C14, C15, C22, C24, C321, C31, C44, C45, C412, C54, C55, C511, C512, C513, and category 2 data are in the remaining undivided subclasses.

According to the above, it is seen that a standard pattern, represented by the large black dot, is determined for each class and subclass from the sample data contained therein. The standard pattern is the center of sample data distribution of each class or subclass.

The divisional relationship among the classes C1-C5 and subclasses C11-C55 is expressed in a tree-structure representation as shown in FIG. 7. In FIGS. 5 and 6 the category 1 data are represented by white circles, the category 2 data are represented by black circles and the standard patterns are represented by large black circles.

Figure 1:
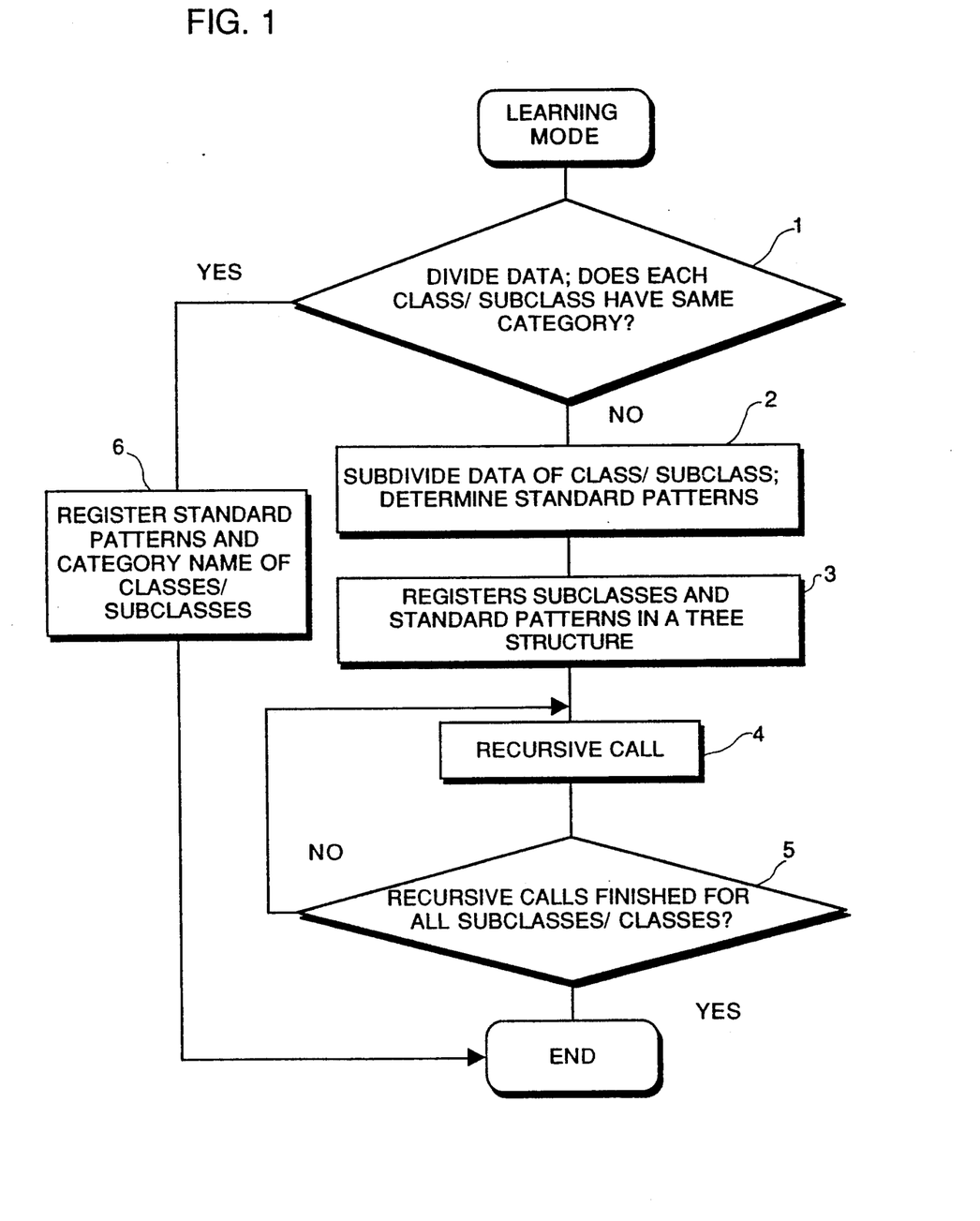
FIG. 1 is a flow chart for the learning process that uses sample data of a known category, that is a flow chart for generating the tree structure for data classification and standard patterns.

FIG. 1 is a flow chart for the learning process steps in the learning mode of the present invention, which uses sample data of known categories, for example the data discussed above with respect to FIGS. 5, 6 and 7. By using the sample data of known categories, the process steps according to the flow chart of FIG. 1 will generate the tree structure of FIG. 7 for data classification or clustering into standard patterns.

The learning proceeds with all sample data being used as the argument for the process. Step 1 divides all sample data into a plurality of classes, for example the classes C1-C5 of FIG. 6 as described previously. Next, step 1 decides if each class has only one category of data.

If the answer to step 1 is no, processing proceeds to step 2. In step 2, a class that does not contain only one category of data is subdivided into subclasses and for each such subclass, the standard pattern for the subclass is determined. For example, in step 2, class C3 of FIG. 6 is subdivided into subclasses C31, C32, C33 and C34, and each subclass has its standard pattern determined.

Step 3 will register the number of subclasses and the standard pattern of each subclass in a storage pointer group. Also, step 3 will register the standard patterns in memory locations specified by the pointers to thereby generate the tree structure shown in FIG. 7.

Step 4 will make a recursive call to the routine, that is proceed to step 1 with the sample data contained in the subclass taken as an argument. Thereby, on the recursive call, for example, subclass C32 may be further subdivided into subclasses C321 and C322 by step 2.

After the recursive call of step 4, step 5 checks to see if the recursive calls made to date have finished for all of the subclasses, that is if after all of the recursive calls, the undivided subclasses and undivided classes each contain only data of one category. If the answer to the question of step 5 is yes, the learning mode is ended, and if the answer is no, the processing proceeds to step 4 for another recursive call.

Step 5 is a recursive call for each subclass whether or not it contains only one category. Thereby, step 5 requires that each class and subclass is subject to a recursive or original processing through steps 1, 2 and 3. After a sufficient number of recursive calls, step 1 will produce an answer yes that each undivided subclass and undivided class have only one category of data therein, and the flow would proceed to step 6.

In Step 6, the standard patterns and the category names are registered in memory as a part of the tree structure, to complete the tree structure, for example shown in FIG. 7.

In the flow chart of FIG. 1, step 2 will be described later in greater detail with respect to FIG. 4.

The procedure shown in the flow chart of FIG. 1 repeatedly subdivides a plurality of sample data of known categories until all the data in each lowest level class/subclass are of the same category, while at the same time generating the tree structure for data classification or clustering along with generating and storing a standard pattern for each branch of the tree structure. Further, the category of each lowest level class and lowest level subclass is stored. An example of the result is shown in FIG. 7.

Figure 3:
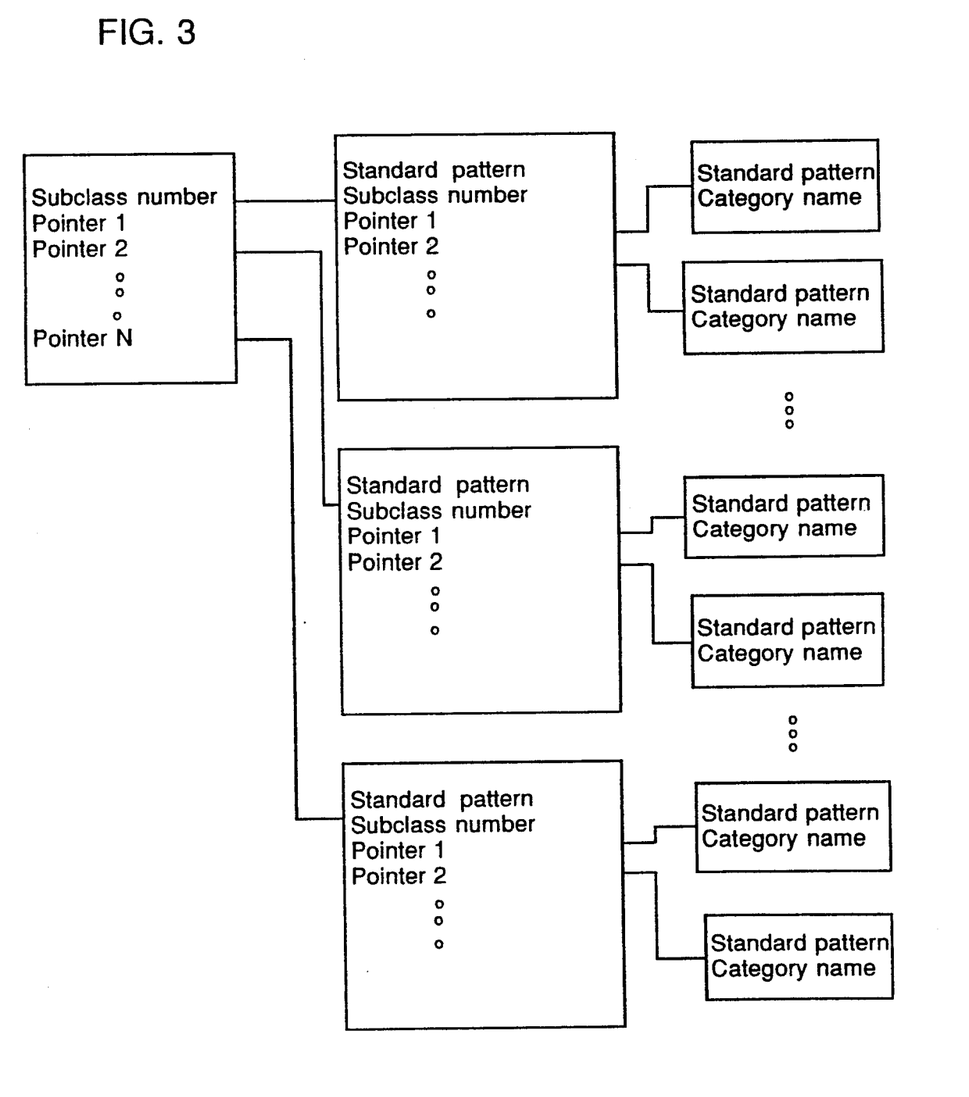
FIG. 3 is an example of a tree structure and standard pattern generated according to the learning process of FIG. 1 and stored in a memory, for example, a computer memory.

FIG. 3 shows another example of a learned tree structure with the standard patterns generated and stored in computer memory as a result of executing the learning mode process according to the flow chart of FIG. 1. The tree structure of FIG. 7 is in the form of a graphic representation of the classes and subclasses with the categories identified for the lowest level of class or subclass. While the corresponding data in computer memory are represented in the tree structure of FIG. 3, the left hand block of FIG. 3 shows a subclass number and pointers that would be registered in accordance with step 3 of FIG. 1, for example, and the rightmost column of blocks would represent the registering of standard patterns with category names for the lowest level classes and lowest level subclasses in accordance with step 6 of FIG. 1.

The learning mode has now ended. Instead of an automatic learning mode as described above, the tree structure represented in FIG. 3 may be placed in memory after being manually generated or produced in any other manner. In any event, after the tree structure, such as that shown in FIG. 3, is provided in the memory, the recognition mode may be entered, which recognition mode will be discussed in detail with respect to the flow chart of FIG. 2.

Figure 2:
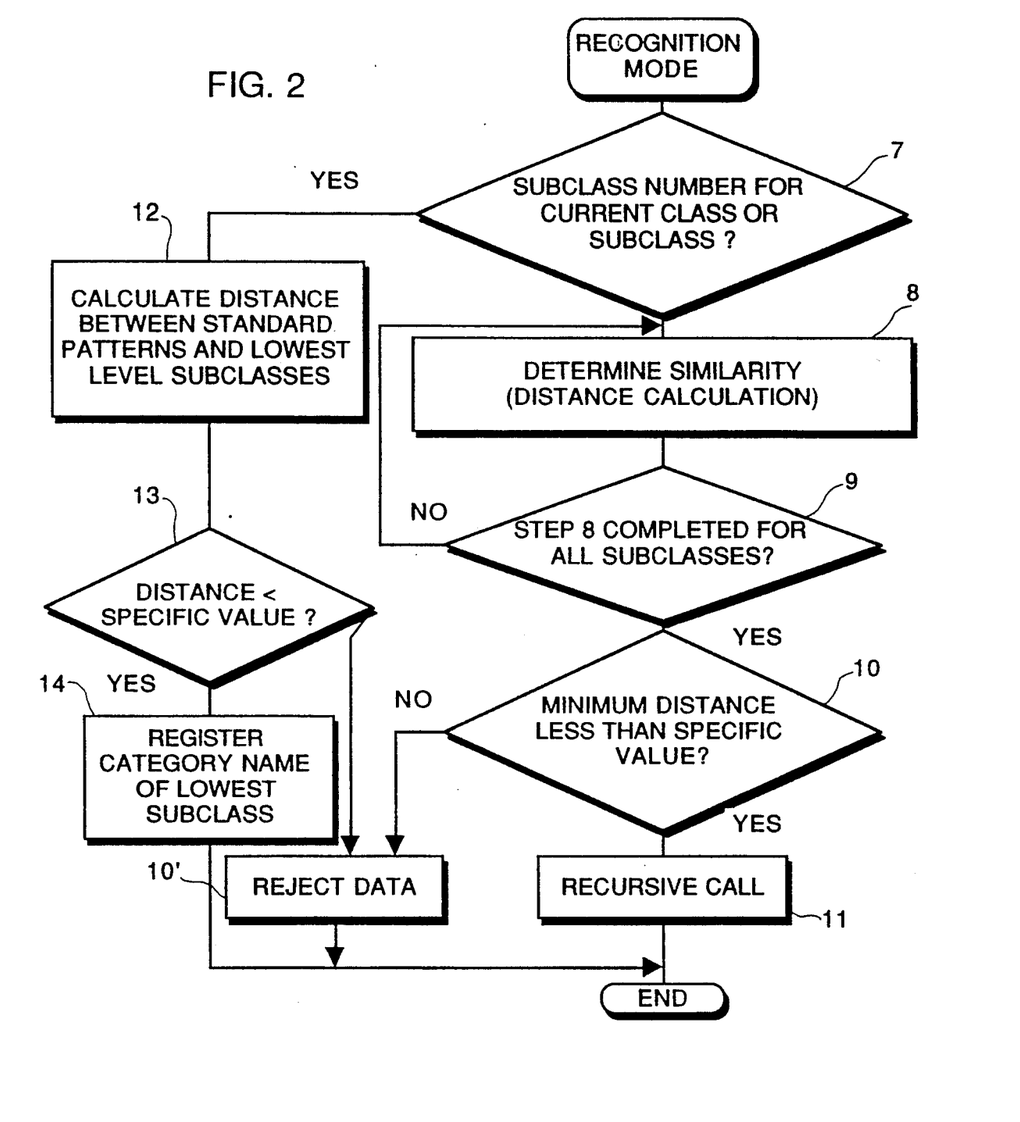
FIG. 2 is a flow chart for identifying a category of input data of unknown category, according to the tree structure obtained from FIG. 1.

Step 7 determines if the current class/current subclass is at the lowest level of the tree structure. If the answer to step 7 is no, processing proceeds to step 8 for calculation of the distances between the standard patterns of the next layer of branching from the current class/current subclass and the input data. That is, the similarity is determined between the input data and each of the next layer of subclasses of the current class or current subclass. For example if the current class is C3 in FIG. 6: from the tree structure organization of data as shown in FIG. 3, the standard patterns for each of the subclasses C31, C32, C33, C34 are obtained; the distance from each of these four standard patterns to the input data is calculated to produce four distance calculations; and the input data are determined to belong to the one of the subclasses C31, C32, C33 or C34 that has the shortest calculated distance.

Next in step 9, it is checked to see if the distance calculation has been completed for all the subclasses. For example, if the distance calculation has been made only with respect to subclasses C31, C32 and C33, but not with respect to C34, the answer is no and processing returns to step 8 for the distance calculation between the input data and the standard pattern of subclass C33. When the answer to step 9 is yes, processing proceeds to step 10. In step 10, a check is made to see if the minimum of the calculated distances before step 8 is less than a predetermined value. For example, the predetermined value may be set beforehand according to the degree of accuracy desired or according to other standards. In the example, the four calculated distances corresponding respectively to subclasses C31–C34 are compared to the predetermined value. If the answer to step 10 is no, processing proceeds to step 10' which will reject the data when the distances between the input data and the standard patterns are too large and thereby indicate no similarity. If the answer to step 10 is yes, step 11 will make a recursive call to this routine for the subclass that has the standard pattern with the minimum distance calculated in step 8. In the example, if it is assumed that the standard pattern of a subclass had the minimum distance to the input data to thereby indicated that the input data belonged to subclass C32, the recursive call to step 7 would then make subclass C32 the current subclass for step 7 so that step 8 would calculate the two distances between the subclasses C321 and C322 and the input data, to be followed by steps 9, 10 and 11 that would again provide the recursive call for either subclass C321 or subclass C322, whichever had the minimum calculated distance that was within the predetermined value of step 10. At this point, if it is assumed that subclass C322 was a subject of the recursive call and therefore the current subclass in step 7, it is seen that step 7 would determine that the current subclass, namely subclass C322, is the lowest level of the tree structure and therefore processing would proceed to step 12.

Step 12 calculates the distance between the input data and the standard pattern of the lowest level subclass, which in the example would mean the step 12 could calculate the distance between the input data and the standard pattern (large dot in FIG. 6) of the lowest level subclass C322.

Step 13 checks to see if the distance calculated in step 12 is less than a predetermined value, and if the distance is not less than the predetermined value, the data will be rejected by passing to step 10', that is when the distance between the input data and the standard pattern is sufficiently large to indicate no similarity. If the distance is less than the predetermined value to produce an answer of yes in step 13, that is if similarity exists, processing proceeds to step 14.

In step 14, there is a registration in the memory of the category name of the lowest level subclass, and this category name of the lowest level subclass is thereby the output of the recognition mode, which is an identification or recognition of the input data. That is, it is determined by the recognition mode that the input data of unknown category is the category registered in step 14. In the example indicated above, it is seen that subclass C322 was registered in step 6 of FIG. 1 with category 2, so that the recognition of the input data as belonging to subclass 322, for the example given, has determined that the input data belongs to category 2.

With the recognition procedure shown in the FIG. 2 flow chart, the input data of unknown category are compared repetitively with the standard pattern of each subclass along a particular path of the tree classification, to determine the category of the input data. When the input data differ greatly from the learned sample patterns, the input data are rejected. It is now seen that the comparison of standard patterns flows along only a single path, which at each node of the tree takes only one branch. Thereby, the speed of the processing is correspondingly great in that it is not necessary to compare the input data with all of the standard patterns of the tree.

Steps 8 and 12 of FIG. 2 calculate distances, and these distances may be calculated between the input data and the standard patterns as a Euclidean distance or a Mahalanobis distance using variance co-variance matrices of sample data belonging to the subclass.

Figure 8A:
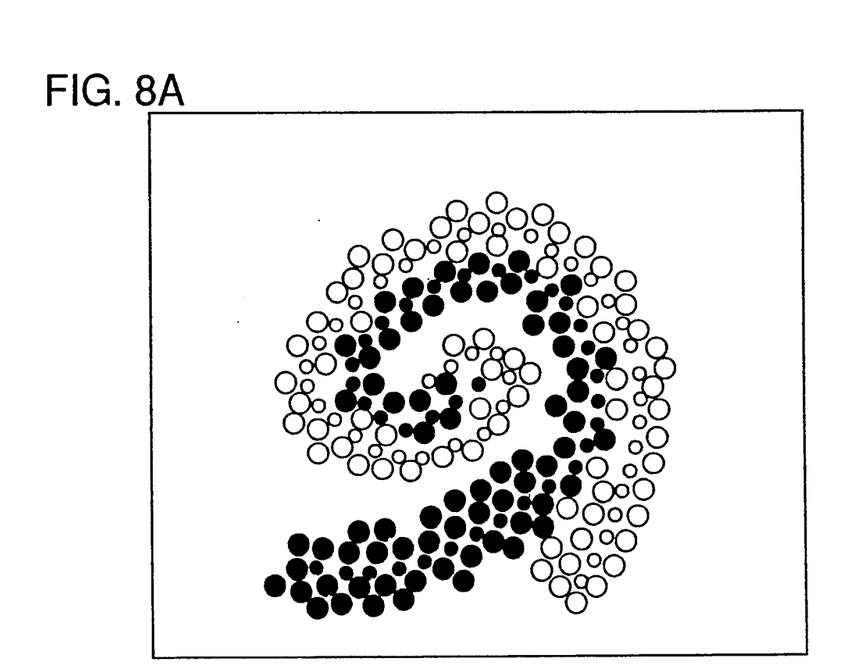
FIG. 8A shows the result of identifying the category of input data whose category is unknown by using the tree structure and standard patterns obtained.

FIG. 8A shows the result of recognizing or identifying the category of input data whose category is unknown, according the recognition processing flow of FIG. 2, by using the tree structure and the standard patterns of FIG. 3 obtained as a result of performing the learning processing sequence of FIG. 1. Small white and black circles represent sample data of two different categories as previously discussed with respect to FIG. 5 & 6. Larger white and black circles represent input data of unknown categories. As is evident from FIG. 8A, coloring of circles (into black and white circles) distinguished the identified categories, with input data of large white circles correctly classified into the same category as the small, white circle sample data and with input data of large black circles correctly classified into the same category as the small, black circle sample data. The blank area in the figure indicates the rejected area. In other words, input data more than a certain distance remote from the sample data is rejected as a result of the distance comparison (similarity) decision.

Figure 8B:
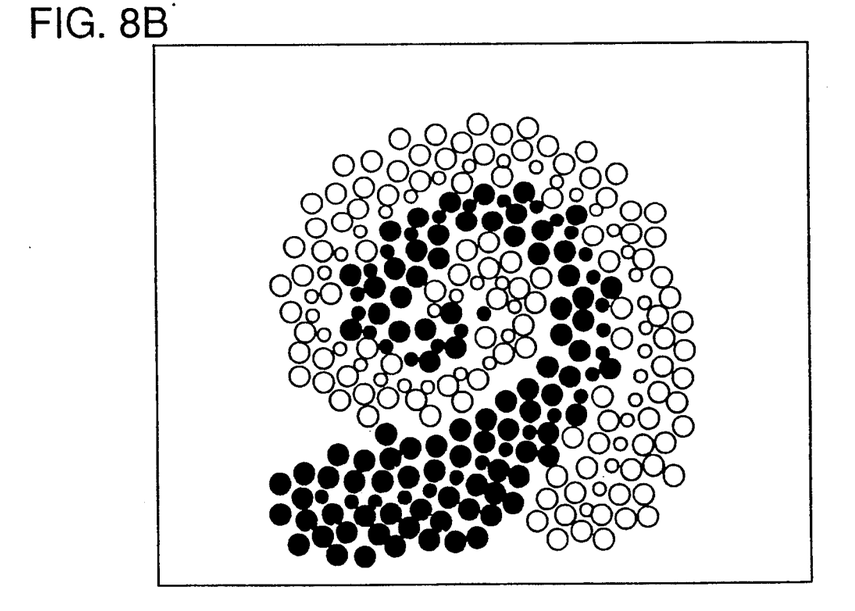
FIG. 8B shows the result of category identification with the condition of distance (similarity) softened.

FIG. 8B shows the result of category identification with the distance (similarity) decision requirements slightly loosened or softened (i.e., the predetermined reference value for the distance decision is increased).

Figure 4:
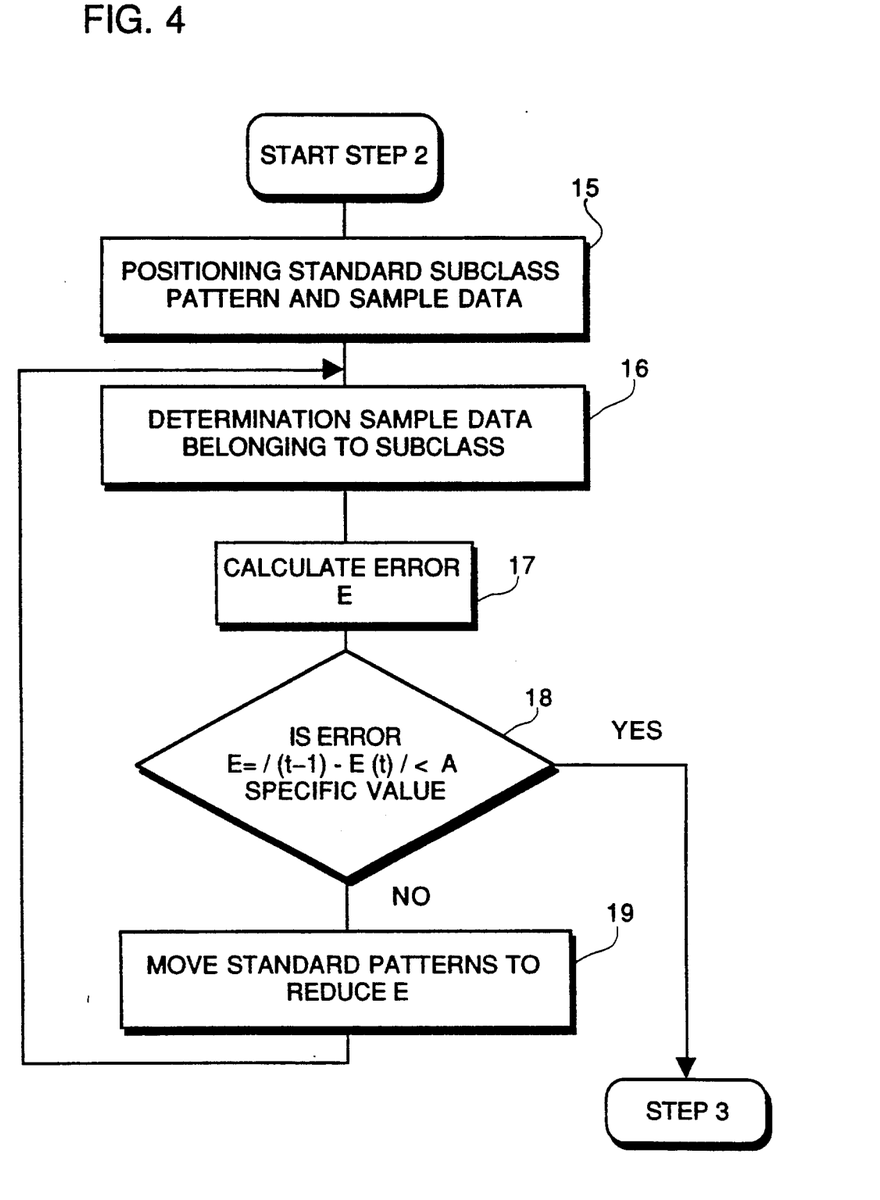
FIG. 4 is a flow chart for generating subclasses as performed by step 2 of FIG. 1, for determining the subclass of the sample data and for determining standard patterns contained in a subclass.

FIG. 4 shows an example procedure for generating subclasses as carried out by learning step 2 of FIG. 1 and determining sample data and standard patterns contained in the generated subclasses.

Step 15 positions a plurality of standard subclass patterns (n data) near the distribution center of the known sample.

Step 16 determine the standard pattern which is closest to each sample data point and then determines sample data which belong to each subclass that has the standard pattern as representative data.

Step 17 calculates an error E between each standard pattern and the sample data belonging to the subclass according to Equation 1 below.
[Equation 1]

$$E = \Sigma_{n=1,N}\{(1/Ln)\Sigma_{l=1,Ln}\{\Sigma_{i=1,2}(_nX_i - _lx_i)^2\}\}$$

where
$(_nX_1, _nX_2)$: standard pattern value for subclass n; n = 1 to N.
N: number of subclasses contained in a parent class (or subclass).
Ln: number of sample data belonging to subclass n.

$(_nX_1, _nX_2)$: sample data value belonging to subclass n.
[Equation 2]

$$_nX_i(t+1) = _nX_i(t) - \alpha(1/Ln)\Sigma_{l=1,Ln}(_nX_i - _lx_i)$$

where
$\alpha$: constant
X(t): standard pattern at time t.

Step 18 checks if the error $E = |E(t-1) - E(t)|$ is smaller than a specific set value. E(t-1) represents a previous error and E(t) represents a current error.

Step 19 moves the standard patterns according to [Equation 2] set forth above when the error E is larger than the predetermined value, and then returns to step 16. The differences between the standard patterns and the sample data belonging to them are summed up in each dimension. The standard patterns are moved in a direction represented by the total difference.

Then the distance between each sample data point and each standard pattern is calculated again to determine the standard pattern nearest each sample data. Then sample data are made to belong to the associated nearest standard pattern. The moving of each standard pattern is repeated until the total difference between the standard pattern and the sample data belonging to it is smaller than a certain value in each dimension.

When the error E becomes smaller than the specific set value, each standard pattern at this time point is taken to be the final standard pattern and each sample data is considered to belong to the subclass in which the nearest standard pattern resides. Then this process of step 2 is terminated.

In FIG. 6, relatively large black circles, which represent a standard pattern for each subclass, and sample data enclosed by a solid line which belong to the same subclass of each standard pattern, are determined by this processing step 2 of FIG. 4.

While the above embodiment deals with a two-dimensional separation problem, this invention can also be applied to separation problems in an n-dimensional space, where n is an integer greater than two. In that case, only the number of dimensions in the Equation 1 need be increased.

Figure 9:
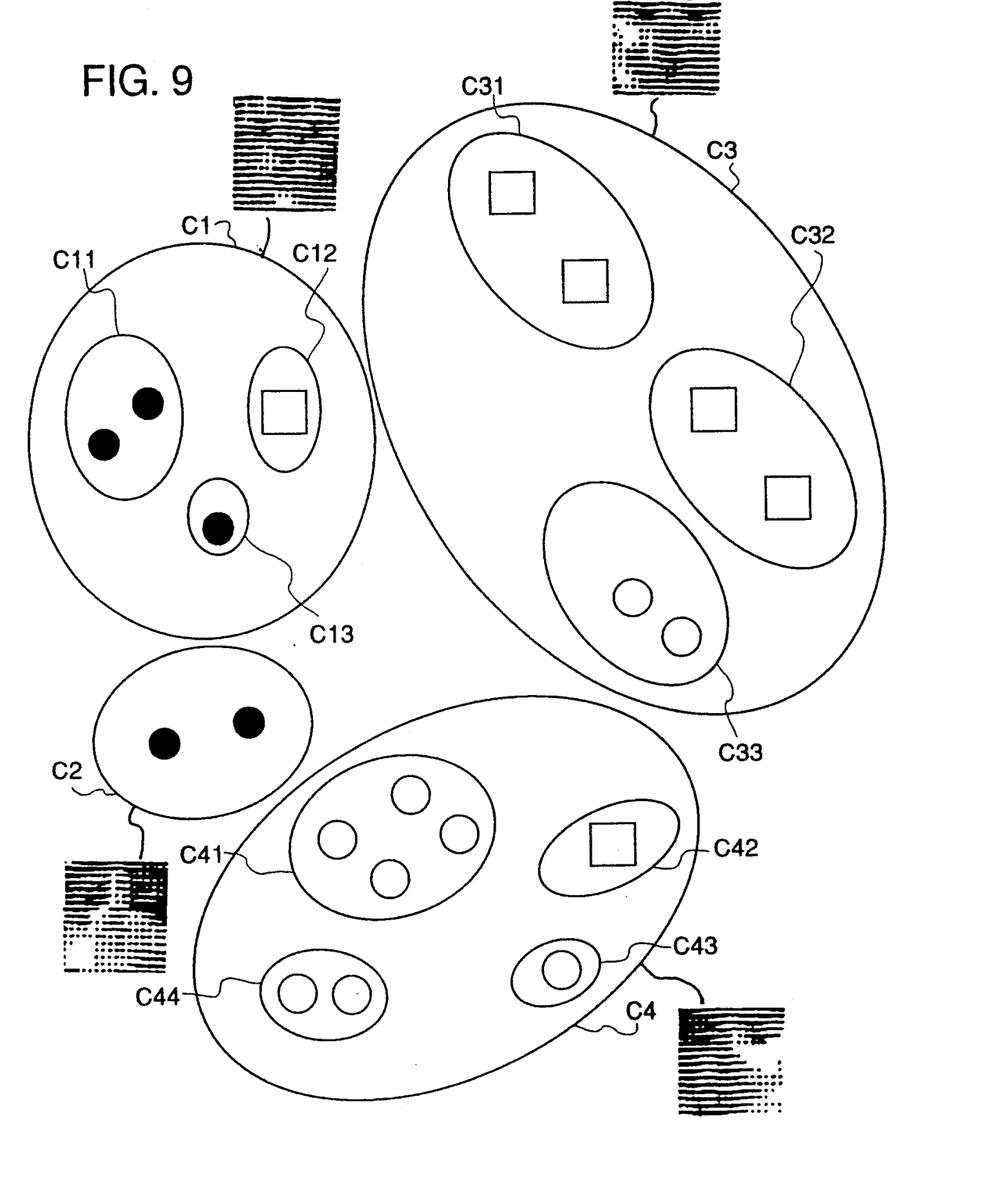
FIG. 9 shows a distribution of sample data in a pattern space that uses facial images, a relationship of inclusion between subclasses and some standard pattern.
Figure 10:
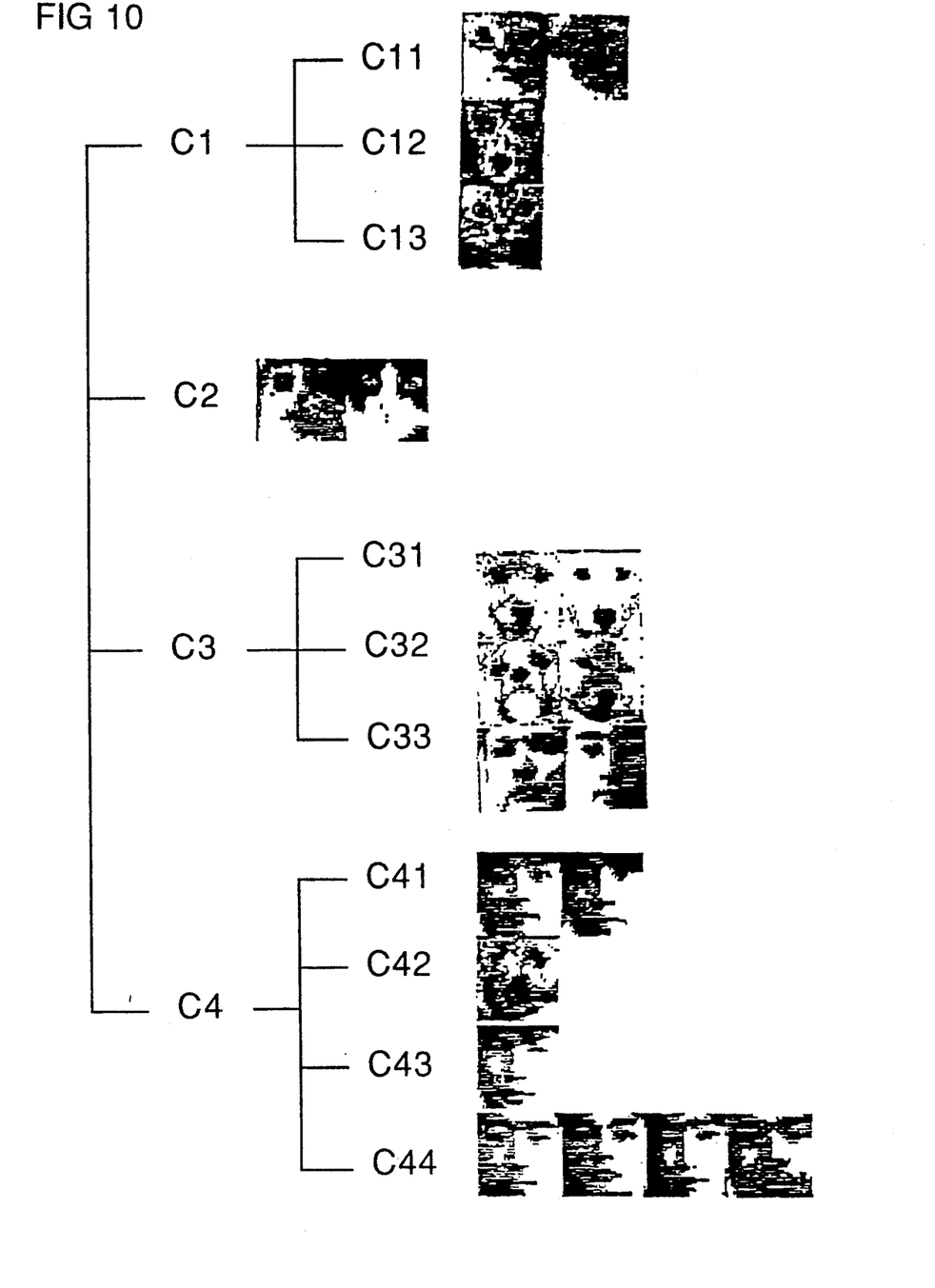
FIG. 10 is a tree structure of subclasses and sample data belonging to each subclass.

FIGS. 9 and 10 illustrate the application of this invention to the classification of facial images. The sample data represent a facial gray image, which has a 16-pixel-by-16-pixel size. In other words, this represents a separation problem in a 256(16×16)-dimensional pattern space, for example.

FIG. 9 shows the distribution of sample data (white circles, white squares, and black circles) in the pattern space and the inclusive relationship among them. That is, class C1 contains subclasses C11, C12, C13; likewise, class C3 contains subclasses C31, C32, C33; class C4 contains subclasses C41, C42, C43, C44; and class C2 contains no subclasses. Standard patterns (sample facial images) for each class are shown. The sample facial images have three categories-"human" (white circles), "dog" (white squares), and "cat" (black circles). Because the 256-dimensional space cannot be represented on a sheet of paper, it is only schematically shown for dimension x, y, z in a three axis image space.

FIG. 10 illustrates the tree structure of subclasses and the sample data belonging to each subclass. That is, subclass C11 belonging to class C1 represents two faces of a $cat_2$, subclass C12 represents one face of a $dog_1$, subclass C13 represents one face of a $cat_3$, class C2 represents two faces of a $cat_1$, subclass C31 represents two faces of a $dog_2$, subclass C32 represents two faces of a dog₃, subclass C33 represents two faces of a human₁, subclass C41 represents two faces of human₂, subclass C42 represents one face of dog₄, subclass C43 represents one face of human₃, and subclass C44 represents four faces of human₄.

Using the learned tree structure of FIG. 10 and the respective standard patterns shown in FIG. 10, it is checked which subclass the unknown facial image data belongs to, making it possible to correctly identify the category of the facial image data at high speed and with high precision.

Figure 12:
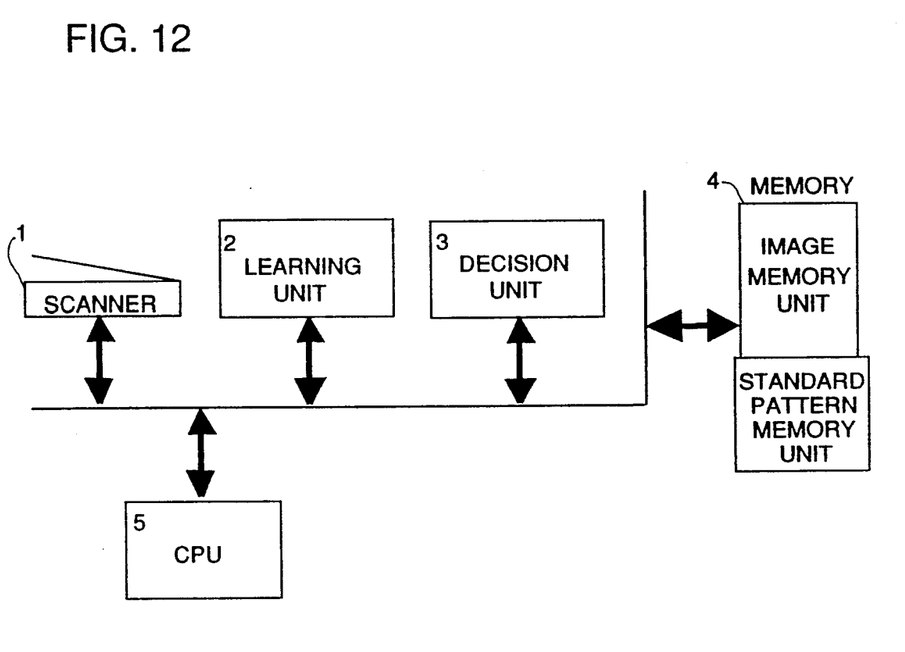
FIG. 12 is an example of a system configuration that embodies the present invention.

The configuration of the system of the invention will be described by referring to FIG. 12.

Image sample data for learning are read in from a scanner 1 and stored in an image memory unit of memory 4. The learning unit 2 generates standard patterns in a tree structure of FIG. 3 according to the learning procedure of FIG. 4, by using the image sample data stored in memory 4. The standard patterns generated are stored in a standard pattern memory unit of memory 4.

Then, image data of unknown category are taken in from the scanner 1. The decision unit 3 compares the image data of unknown category with the standard patterns stored in the standard pattern memory unit according to the input data category identification procedure of FIG. 2 to determine its category. The CPU 5 controls the overall operation sequence, i.e., input of image and operation of the learning unit 2, decision unit 3 and memory unit 4.

As explained above, this invention converts a so-called nonlinear separation problem, in which sample data contain plural categories, into a plurality of partial linear problems by dividing data into subclasses each of which is linear by having only data of one category. Hence, the invention can be applied to nonlinear separation problems and can also perform similarity calculations at high speed.

The invention uses sample data and generates a tree structure for data classification in a learning mode, and, according to the tree structure, a decision is made about input data in a recognition mode, making it unnecessary to compare the unknown input data with all the standard patterns, which in turn speeds up the processing. The similarity of the input unknown data with the standard patterns can be determined by calculating the distance between them. By checking the similarity between the standard patterns and the input unknown data through the distance between them, unexpected data of unknown category can be rejected, improving the accuracy of the recognition decision.

While the preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed:

1. An automatic pattern recognition method to determine a category of input data points of unknown category, comprising:

performing a first learning step of dividing sample data points into classes, which includes generating sample data points whose categories are known, generating a plurality of standard patterns in an n-dimensional space at arbitrary positions near a center of sample data points distribution, which standard patterns correspond to an arbitrary plurality of classes of the sample data points, calculating the distances between individual sample data points and each of the standard patterns to determine the nearest standard pattern for each sample data point, temporarily classifying each sample data point as belonging to the class corresponding to the nearest standard pattern, calculating the summation of differences between each standard pattern and the corresponding sample data points for each dimension for each class, moving the standard patterns in a direction represented by the summation of differences for each class, temporarily classifying each sample data point as belonging to the class corresponding to the nearest moved standard pattern, recalculating the distances between each sample data point and each moved standard pattern to determine the nearest standard pattern for each sample data point, moving the standard patterns in a direction represented by the summation of differences, repeating the preceding three steps until the summation of differences between each standard pattern and the corresponding sample data points is smaller in each dimension than a set specific value, and determining a final position of each standard pattern and sample data points belonging to the class represented by the corresponding standard pattern;

performing a second learning step, when the sample data points belonging to one class do not belong to the same category, which includes dividing the one class into a plurality of subclasses, and repeating said step of dividing for the sample data points for each remaining class and subclass that has sample data points of more than one category;

performing a third learning step of relating the standard patterns, classes and subclasses obtained in the first learning step and second learning step to each other in a tree-structure representation and storing the tree-structure representation in memory;

inputting data points of unknown category; and determining recognition/nonrecognition of the input data points of unknown category based on correspondence/lack of correspondence between the input data points and the stored tree-structure representation.

2. The method of claim 1, wherein the step of determining recognition/nonrecognition includes the steps of:

identifying the classes in the tree-structure to which the input data points of unknown category are nearest in distance by checking the distance of the input data points to the standard pattern of each class;

when the identified class has subclasses in the tree-structure, identifying the subclasses to which the input data points are nearest in distance by checking the distance to the standard pattern of each subclass;

repeating this last identifying step with the identified subclass until a lowest-level subclass is reached; and identifying the category of the lowest-level subclass to which the input data points closest as the category of the input data points.

3. A method as claimed in claim 2, wherein when the distances between the input data points unknown category and the standard patterns of classes or subclasses in any one of said identifying steps are greater than a predetermined value, discarding the input data points as having an unknown category dissimilar to the categories of the sample data points.

4. An automatic pattern recognition method to determine a category of input data points of unknown category, comprising:

performing a first learning step of dividing sample data into classes, which includes generating sample data points whose categories are known, generating a plurality of standard patterns in an n-dimensional space at arbitrary positions near a center of sample data points distribution, which standard patterns correspond to an arbitrary plurality of classes of the sample data points, calculating the distances between individual sample data points and each of the standard patterns to determine the nearest standard pattern for each sample data point, temporarily classifying each sample data point as belonging to the class corresponding to the nearest standard pattern, adjusting the positions of the standard patterns if the difference between each standard pattern and center of distribution of the corresponding sample data points is not smaller in each dimension than a set specific value;

repeating the preceding three steps until the difference between each standard pattern and center of distribution of the corresponding sample data points is smaller in each dimension than a set specific value, and determining a final position of each standard pattern and sample data points belonging to the class represented by the corresponding standard pattern;

performing a second learning step, when the sample data points belonging to one class do not belong to the same category, which includes dividing the one class into a plurality of subclasses, and repeating said step of dividing for the sample data points of each remaining class and subclass that has sample data points of more than one category;

performing a third learning step of relating the standard patterns, classes and subclasses obtained in the first learning step and second learning step to each other in a tree-structure representation and storing the tree-structure representation in memory;

inputting data points of unknown category; and determining recognition/nonrecognition of the input data points of unknown category based on correspondence/lack of correspondence between the input data points and the stored tree-structure representation.

5. The method of claim 4, wherein the step of determining recognition/nonrecognition includes steps of:

identifying the classes int he tree-structure to which the input data points of unknown category are nearest in distance by checking the distance of the input data points to the standard pattern of each class;

when the identified class has subclasses in the tree-structure, identifying the subclasses to which the input data points are nearest in distance by checking the distance to the standard pattern of each subclass;

repeating this last identifying step with the identified subclass until a lowest-level subclass is reached; and identifying the category of the lowest-level subclass to which the input data points are closest as the category of the input data points.

6. The method of claim 4, wherein when the distances between the input data points of unknown category and the standard patterns of classes or subclasses in any one of said identifying steps are greater than a predetermined value, discarding the input data points as having an unknown category dissimilar to the categories of the sample data points.

* * * * *